United States Patent

Braun et al.

[11] 3,904,007
[45] Sept. 9, 1975

[54] FLUID ENGAGED CLUTCH WITH SPEED AND ACCELERATOR CONTROLS

[75] Inventors: Eugene R. Braun, Royal Oak; Elmer A. Richards, Kalamazoo, both of Mich.

[73] Assignee: Eaton Corporation, Cleveland, Ohio

[22] Filed: Oct. 9, 1973

[21] Appl. No.: 404,221

[52] U.S. Cl. ............ 192/.076; 192/103 F; 74/856; 192/.032
[51] Int. Cl.² ................ F16D 43/284; B60K 29/00
[58] Field of Search .......... 192/.076, 3 G, .03, .032, 192/.033, .034, .07, .075

[56] References Cited
UNITED STATES PATENTS

| | | | |
|---|---|---|---|
| 2,095,779 | 10/1937 | Whittington | 192/.076 |
| 2,127,752 | 8/1938 | Price et al. | 192/.076 |
| 2,566,631 | 9/1951 | Price | 192/.076 |
| 2,713,403 | 7/1955 | Rodgers | 192/3 G |
| 2,756,851 | 7/1956 | Collins | 192/.076 X |
| 2,880,831 | 4/1959 | Maurice et al. | 192/.052 |
| 3,273,679 | 9/1966 | Uher | 192/.076 X |
| 3,402,793 | 9/1968 | Scholl | 192/.076 X |

*Primary Examiner*—Benjamin W. Wyche
*Attorney, Agent, or Firm*—Teagno & Toddy

[57] ABSTRACT

Transmission and engine control means for a vehicle wherein the engine is connected through at least one friction clutch to a transmission having a positively geared power train therethrough. A low speed governor is provided to sense an engine speed at or shortly below idling speed and functions to increase fuel supply to the engine as same is lugged down for maintaining, within the capacity of the engine, at least said selected minimum speed. Further, means are provided responsive to the position of the throttle control, such as the accelerator pedal, for modulating the engagement pressure of said clutch in response to the position of such throttle control, progressive opening of the throttle effecting progressive increase in the torque transmitting capacity of the clutch, whereby the torque transmitting capacity of the clutch is under all throttle settings maintained at a value a little greater than the load torque normally applied thereto at such throttle setting. If desired, further means may be provided for deactivating and disengaging said transmission clutches entirely when the throttle is in its idling position and the vehicle is either at standstill or at a speed below a selected value.

2 Claims, 2 Drawing Figures

FLUID ENGAGED CLUTCH WITH SPEED AND ACCELERATOR CONTROLS

FIELD OF THE INVENTION

This invention relates to transmission control means and particularly to a system for enabling a vehicle, having a spur gear transmission including at least one gradually engageable clutch between given transmission ratio gears and the engine, to start smoothly under semi-automatic control from standstill and without possibility of stalling, excessive acceleration, jerking on shifting or other abuse on the part of the operator.

BACKGROUND OF THE INVENTION

The invention arises out of long continued efforts to provide vehicle, and especially truck, transmissions with the flexibility of full manual control by the operator on the one hand and on the other hand the maximum convenience and freedom from abuse by the operator of fully automatic transmissions.

In connecting a geared transmission (as distinguished from a torque converter) to a prime mover, it has long been known to accomplish same through a friction clutch. This has been common for many years in both passenger car and truck installations. It has the well recognized advantage of giving the operator complete and positive control over the rate of buildup of torque output by the transmission and requires minimum apparatus but, particularly for truck installations, requires a high level of both competence and carefulness on the part of the operator. All of this has been well known virtually from the beginning of automotive practice. The engine can be stalled if the clutch is engaged more rapidly than can be handled by the buildup of engine output resulting from simultaneous depression of the accelerator pedal or on the other hand the vehicle can be caused to generate excessive strains within its driving train if shifts are made jerkily or even sometimes if the accelerator pedal is depressed rapidly and suddenly while the clutch is simultaneously engaged suddenly. A competent and careful driver can and does successfully control both the engagement of the clutch and depression of the accelerator pedal but a driver of less competency and/or carefulness can abuse a vehicle, especially a truck, seriously. This problem is recognized as particularly acute where it is remembered that an internal combustion engine, whether of the spark ignition or compression ignition type, will at a given throttle setting first increase its torque output somewhat as its speed is reduced from the maximum speed for such throttle setting and then diminish the torque produced as its engine speed is still further reduced. Thus, when as engine is excessively loaded so that its speed diminishes below a certain point, its torque output likewise diminishes which accelerates the rate of speed reduction and the progression toward stalling proceeds on a rapidly steepening curve. All this is well known and is normally compensated for by the driver by depression of the accelerator pedal and increasing the fuel supply to the engine. However, this must be done skillfully for an excessive depression of the accelerator pedal will excessively and suddenly increase the torque output of the engine and cause same to jerk with resulting unpleasant effects on the driver (and passengers if any), on the payload carried by the vehicle and on the drive train.

This being undesirable for obvious reasons, particularly for heavy duty vehicles, it has long been desirable to provide automatic means for effecting the starting functions of the vehicle but protecting said vehicle from either careless and/or incompetent handling. In an attempt to meet this objective, some workers in the field have provided automatic transmissions wherein the control functions are taken away from the driver completely and are programmed according to some predetermined ideal starting situation. This works well enough in most instances but such transmissions are expensive, require a substantial amount of maintenance and because of their rigidly preprogrammed characteristics, sometimes fail to be adaptable to certain specific operating requirements. Other workers in the field in an attempt to meet the foregoing named objective have utilized torque converters between the prime mover and a transmission. This likewise operates well enough but it is also expensive, requires considerable maintenance and is the source of considerable power loss for well-understood reasons.

It is therefore still desirable to provide if possible control means primarily adaptable to a starting situation for a transmission having positively interengageable gear teeth, such as spur gear teeth, and wherein the transmission is connected to the prime mover by at least one friction clutch which, when fully engaged, provides a positive drive from the prime mover to the transmission and yet to control such interengaging means by apparatus which will be consistent with control means to which drivers are already accustomed and which will insure against the undesirable consequences of careless or incompetent handling of presently known fully manual (pedal) operated apparatus. In at least the broadest concept of the invention it is immaterial whether the friction clutch be a single clutch located between the prime mover and the transmission or whether same be friction clutches within the transmission by which the desired gear ratios are selected for operative connection between the input and output shafts ·¹ f.

A, ·  ly, the objects of the invention include:

1. ₁o provide a control device for a vehicle, particularly adaptable for the starting thereof, which will permit the use of a positively gear engaged transmission utilizing a friction clutch for energizing same but will protect the vehicle and particularly the power train thereof against the consequences of careless and/or incompetent operation.

2. To provide apparatus, as aforesaid, which will insure that sufficient fuel is supplied to the prime mover regardless of the extent to which the operator has in a given instance depressed the accelerator pedal to insure that the engine under the starting conditions actually imposed at a given time will have sufficient fuel to produce, within its operating capacity, the torque required and avoid stalling.

3. To provide apparatus, as aforesaid, which will be immobilized when the vehicle is at standstill or moving at less than a predetermined speed and the throttle is at its idle setting, whereby to insure against imposing driving torque onto the drive train of a standing or substantially standing vehicle when same is not desired.

4. To provide apparatus, as aforesaid, which is particularly adaptable to use with a diesel engine as the prime mover.

5. To provide apparatus, as aforesaid, which is particularly adaptable for use with heavy vehicles, such as trucks.

6. To provide apparatus, as aforesaid, which is relatively simple and hence economical both in the original manufacturing thereof and in the maintenance thereof.

Other objects and purposes of the invention will be apparent to persons acquainted with apparatus of this general type upon reading the following disclosure and inspection of the accompanying drawings.

SUMMARY OF THE INVENTION

Assuming the invention to be applied as is preferable to a positive gear, as a spur gear, transmission through ratio determining friction clutches, there are provided suitable ratio control devices, normally pressure fluid valves, which are selectable by a suitable selector device. The power input to said ratio control devices is subject to two parallel connected energizing devices, switches or valves as appropriate, which devices may for example be normally in a power interrupting condition and may be rendered power conducting independently of each other, one by opening of the throttle to other than idling speed and the other by attainment by the vehicle of a speed in excess of a selected low speed, such as three miles per hour. Another control is connected to the throttle control, normally the accelerator of the vehicle, and includes a pressure regulator which acts to control the pressure applied through said ratio control devices to the clutches. Thus, opening of the throttle (depression of the accelerator) will progressively increase the pressure applied to whichever one of the transmission clutches (or to the main clutch if such is used) is activated at a given moment. In addition there is provided a low speed governor to maintain the engine at at least an idling speed, which will open the throttle as the engine is pulled down from normal driving speed to try to maintain same at least at such idling speed and prevent it from stalling.

DETAILED DESCRIPTION

Figure 2:
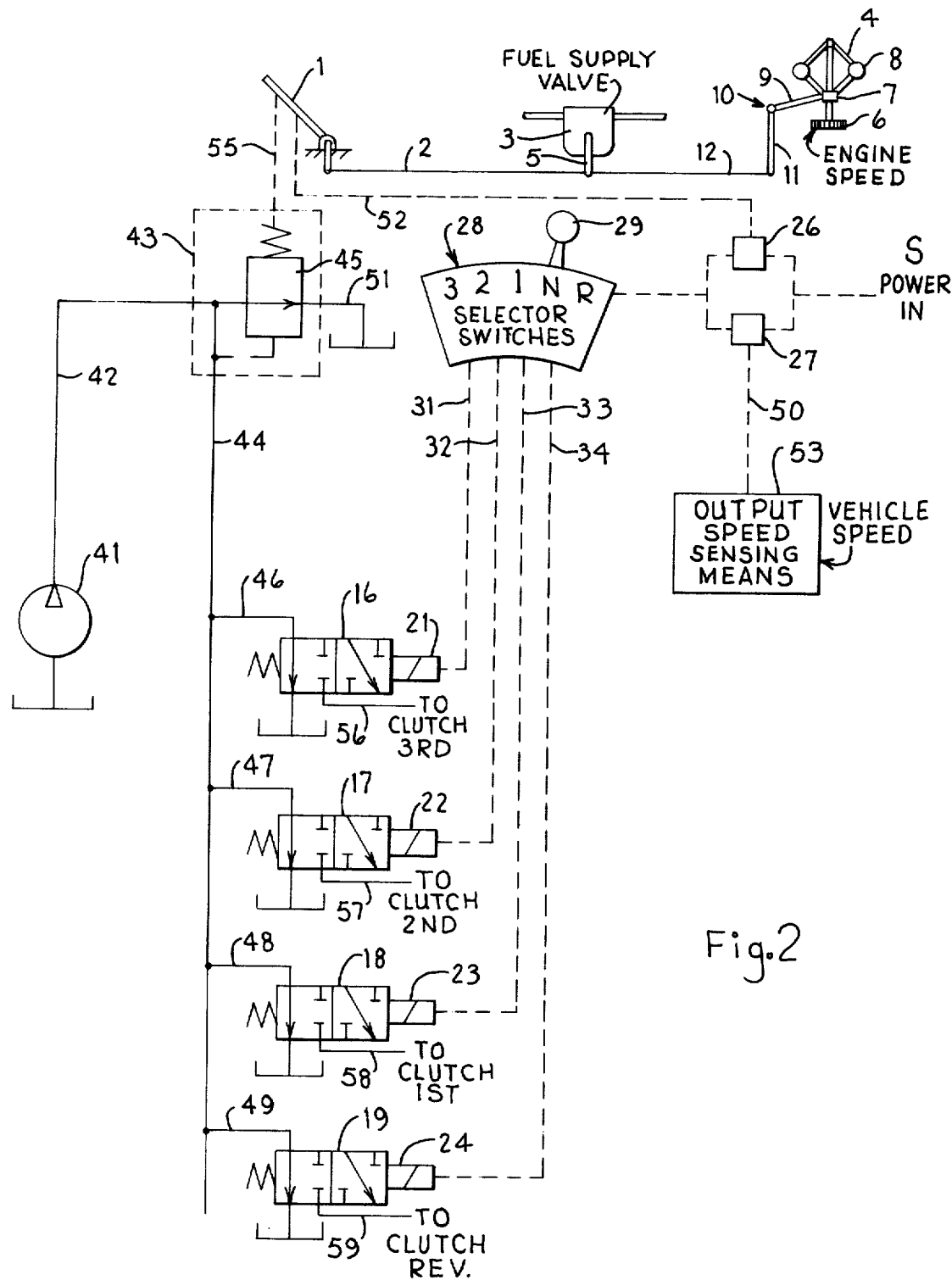
FIG. 2 is a schematic diagram of apparatus embodying the invention.

Referring to FIG. 2, there is diagrammatically shown a system of engine and transmission controls embodying the invention. Inasmuch as the individual components of these controls may be any of many presently well known types and forms, the details are not given but may be supplied as appropriate to a given installation by any skilled worker in the art.

The throttle control 1 is here shown as a conventional foot accelerator which is connected by conventional linkage 2 to the control lever 5 of a fuel supply valve 3, here assumed to be the fuel valve of a compression ignition engine. The low speed governor 4 is driven in any conventional manner in response to engine speed, such as by a drive gear 6, and the slider 7 thereof responds in a conventional manner to the vertical position of the fly balls 8 to operate one arm 9 of a bell crank 10 whose other arm 11 acts through a further linkage 12 also onto the control lever 5 of the fuel valve 3. Suitable motion absorbing means (not shown) are provided to enable the linkages 2 and 12 to act each independently of the other onto the lever 5. Thus, in any conventional and presently known manner the position of the fuel supply valve is determined either by the position of the throttle control 1 or by the position of the governor 4, each acting independently of the other. All of this is conventional, is well known and requires no further explanation.

In a typical installation embodying the invention and assuming for an illustrative but not limiting embodiment that the transmission in question utilizes a plurality of ratio selecting pressure responsive friction clutches, and that there is no main clutch or at least none connected into this system, there will be provided a plurality of ratio selecting valves, here exemplified by the four valves 16, 17, 18 and 19. Each of said four valves is appropriately controlled, here by solenoids 21, 22, 23 and 24, respectively. Each of said solenoids is energizable from the source S acting through parallel connected energizing control devices, either switches or valves as appropriate, 26 and 27, then through a manually operable selector 28. The position of the selector handle 29 is determined in a conventional manner by the operator of the vehicle and acts through appropriate energy transfer means, conductors or conduits as appropriate, here indicated at 31, 32, 33 and 34 to energize an appropriately selected one of the above-mentioned solenoids 21–24.

A suitable source 41 of pressure fluid is conducted by a suitable conduit 42 to a pressure regulator 43 and thence by the conduit 44 to conduits 46, 47, 48 and 49 which are respectively connected, in one setting of said valves 16–19, through the valves 16–19 back to the low pressure side of the fluid system. In the other setting of said valves, the pressure conduits 46–49 are respectively connected through conduits 56–59 to the above-mentioned pressure responsive friction clutches for engaging a desired ratio of the transmission. Thus, when the selector handle 29 is in the position shown in FIG. 2 and each of the solenoids 21–24 is deenergized, the valves 16–19 will be in the deenergized positions shown and the fluid pressure generated at the source 41 will merely return to the low pressure side of the pressure system. However, when, for example, the handle 29 is moved to the first speed position the energy conducting means 33 will energize the solenoid 23 to shift the valve 18 into its energized position (leftwardly as appearing in FIG. 2) so that pressure fluid appearing in the line 48 will be conducted through conduit 58 to the clutch operating means associated with the first gear speed of the transmission and said transmission will then in a conventional manner assume its first speed condition.

The manner by which such clutches may control a transmission for this purpose is already well known and is fully set forth by many patents, of which U.S. Pat. No. 2,648,922 to J. G. Vincent is an example, and hence needs no further detailing.

In the meantime the pressure regulator includes an appropriate means such as an adjustable orifice device 45 which responds to the position of the throttle control 1 for controlling the pressure fluid escaping therethrough to a line 51 and thence back to the low pressure side of the pressure system and thereby determining the magnitude of pressure appearing in the line 44. This determines the pressure appearing in each of the lines 46–49 and thereby on whichever of the transmission clutches may be connected thereto by energization of the appropriate ones of the valves 16–19.

It is common for transmission clutches which are operated by pressure fluid to require a short time for the operating cylinders thereof to fill before pressure builds up to the value set by the pressure regulator. Therefore, the engine response to the depression of the throttle may be faster than the clutch pressure and torque build up. However a very short time after the engine speeds up, the clutch torque builds up to the pressure regulator value so that the clutch torque capacity exceeds the maximum engine torque for the specified throttle setting.

Any appropriate linkage generally indicated at 52 will connect the throttle control 1 to the energy control device 26 by which same is caused, or permitted, to assume an energy blocking condition when the throttle control is at or near its zero (idling) position and move to an energy conducting condition when the throttle control 1 is moved a predetermined distance away, usually only a very small amount, from said zero or idling position.

A device 53 of any known type is provided responsive to transmission output (or vehicle) speed and connected to the energy control device 27. The arrangement is such that the device 27 is in an energy blocking position when the vehicle is at or below a relatively low predetermined speed, such as three miles per hour, but the device 27 will become energy conducting when the vehicle speed exceeds said predetermined value.

In the preferred embodiment illustrated in the drawings, the power supply S and the means connecting same through the selector 28 to the value controls 21–24 are electrical, the conducting means 46–49 and 56–59, respectively, conduct a pressure fluid, either air or hydraulic, and the connecting means 2, 12, 50, 52 and 55 are mechanical. However, the selection of the particular form of power transmitting means is a matter of choice on the part of the designer to meet given operating conditions and any of these power transmitting means may be electrical, pressure fluid or mechanical as desired and appropriate in a given instance.

OPERATION

Figure 1:
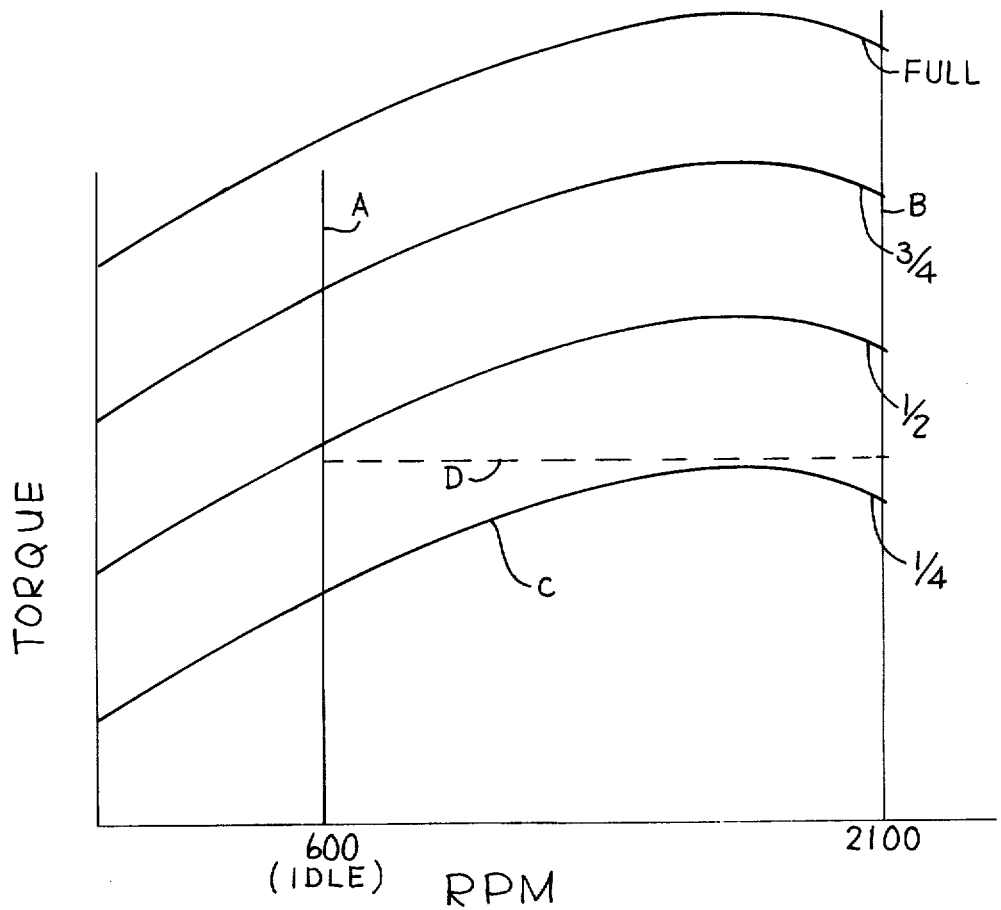
FIG. 1 is a speed torque curve of a typical diesel engine which will be referred to for further discussing the problem solved by this apparatus and for describing the function of the apparatus.

Assuming for purposes of illustration that the system herein described is used with a compression ignition type of engine, reference is made to FIG. 1 for illustration of the normal operating relationship thereof. Horizontal distances therein indicate engine speed in rpm's and vertical distances indicate the torque values. The line A indicates engine idling speed and the line B indicates normal rated speed of 2100 rpm's. Line C indicates the torque-speed relationship of the engine at one-quarter throttle position and shows that under normal operating conditions the torque increases at first as rpm's increase to an optimum point and then decreases slightly as the rpm's continue to increase. Thus, as load appears on the vehicle which is operating at 2,100 rpm's and the engine responds thereto by slowing down, the torque at first increases and assists the engine in meeting the additional load applied. However, when the optimum point is passed, then the slowing and decrease in torque are increasing and progressive in response to each other and the vehicle, if not properly handled, will quickly stall. The torque developed by the engine at any given speed will, of course, depend upon the throttle setting and to insure that the torque developed at any given throttle setting for a range of speeds appropriate thereto will be transmitted to the transmission gearings, but without jerking, during shifts or if the accelerator should be depressed too rapidly and too suddenly, it is desirable that the torque transmitting capacity of the clutch remain above, but no more so than necessary, the torque generating capacity of the engine for all speeds at a given throttle setting. This is indicated by the broken line D in FIG. 1, which line indicates that the clutch should have a torque transmitting capacity which is just slightly greater than the maximum engine torque at the specified throttle setting.

Turning now to FIG. 2, with the vehicle at rest and the engine idling, the throttle control 1 will be at its zero position to open the switch 26 and the speed sensor 53 will indicate zero vehicle speed and open the switch 27. Thus, all of the solenoids 21–24 are deenergized and the valves 16–19 are in the positions shown in FIG. 2. Thus, none of the clutches are energized and the transmission is in its neutral position. This will be true regardless of the position of the control knob 29 inasmuch as no power is being supplied to the selector. Thus, the control knob can be moved into any desired gear position, such as first position, without causing any shifting or other activation of the transmission to take place.

Now as the throttle control 1 is depressed, the switch 26 will be closed and energy from the power source S will be supplied to the selector 28 and, with the control handle 29 in its first gear position, energy will be supplied to the solenoid 23 for shifting the valve 18. This applies pressure fluid to the first speed clutch for effecting engagement thereof. At the same time the depression of the throttle control 1 will act through the pressure regulator 43 to increase the pressure within the line 44 by an amount which is a function of the depression of said throttle control, and thereby apply a similarly increasing force for causing engagement of the first gear clutch.

It will be evident, in view of the foregoing, that the parameters are arranged so that at a given throttle position the torque capacity of the fully engaged clutch will be somewhat higher, for example 10–30 percent higher, than the engine torque applied thereto under normal operation in the gear position in question. Further in the illustrated embodiment the oil pressure supplied to the clutch cylinders is assumed to be a function of the throttle depression so that at any selected throttle setting the clutch torque curve (D in FIG. 1) is a straight line whose position (magnitude) is determined by the throttle setting but which is independent of engine speed.

Since the torque transmitting capacity of the engaged transmittion clutch is determined by the position of the accelerator pedal, it will be understood that under starting conditions (i.e., with the vehicle at standstill and the throttle only a little depressed) the clutch will slip in the same manner as with pedal control and the engine speed will increase. After a short time delay to fill the operating cylinder of the clutch, the clutch pressure and torque capacity will increase to exceed the engine torque and start to lug the engine down in speed. The clutch will continue to slip as the clutch torque increases but the vehicle will start to move.

As the vehicle gathers speed, the vehicle will gain speed with respect to the engine and hence the clutch slippage diminishes. The vehicle is thus started smoothly and without jerking in the same manner as accomplished by manual control with a skilled and careful operator.

If, during the starting operation, the vehicle meets a substantial resistance, such as a steep incline, the torque requirements are increased and the engine is lugged down toward its idling speed. Again, a skilled operator will increase the fuel supply by depression of the accelerator but if the operator is not skilled or is inattentive, when the engine slows to its idling speed the governor 4 will sense this condition and cause the fuel supply to increase sufficiently to supply the torque required. In other words, the decrease in speed will be halted at the idle line 8 and the torque will be increased along said line up to the point permitted by the clutch torque line D, thus preventing engine stalling. As the vehicle gathers speed the vehicle will gain speed with respect to the engine, clutch slippage will diminish and the vehicle will be started smoothly.

During shifting the torque applied to the engaged clutch (in one direction or the other depending on whether the shift is an upshift or a downshift) will depend upon the position of the accelerator pedal. Thus, the clutch torque required to effect the synchronization of the shift will be a little greater than the engine torque output at the given throttle position and thereby provide a smooth shift.

If during operation the vehicle should encounter a downward slope so that the operator releases the accelerator pedal 1 completely and thereby opens switch 26, this will still not return the transmission to neutral but will instead respond to the vehicle speed sensing means 53 acting through the switch 27 to maintain the transmission in the operator selected gear and thereby utilize the engine drag for the downhill operation.

However, when the vehicle is subsequently stopped and the throttle pedal 1 returned to its zero position, then both switches 26 and 27 are opened and the solenoids 21–24 will all be deactivated. This returns the valves 16–19 to their de-energized position and returns the transmission to its neutral position and same will occur even though the selector knob 21 remains in a ratio selecting position.

If and as the throttle is advanced to generate progressively more torque as needed by the engine, the regulator 43 will respond to the throttle position and cause progressively more pressure to appear in line 44 and consequently progressively more pressure to appear onto whatever transmission clutch is energized at a given time. Thus, said clutches as same are engaged from time to time will always be engaged with sufficient force to transmit whatever torque is required and available from the engine in response to the throttle position.

However, if the operator advances the throttle very suddenly, the above-mentioned slowing of the response thereto of the engaging clutch to a point slightly behind that of the engine, will permit said clutch again to initially slip and then stabilize as the vehicle gathers speed in response to the engine. This again avoids jerking, especially in low speed transmission settings, which thus avoids resultant strain on the drive train.

It will be further recognized that the use of this system will in no way inhibit the normal functioning of friction clutches to render smooth the shifting from one speed ratio to another in a conventional manner but with positive locking of the parts during normal operation to attain the higher efficiency already known to exist in such an arrangement.

In the foregoing embodiment, each of the pressure lines 56–59 has been assumed to lead to and operatively connect with a clutch whose engagement effects a selected ratio condition in the transmission. Spur gear transmissions with non-positive, as frictional or magnetic, clutches to engage gear sets or planetaries with frictionally engaging bands are examples of such transmissions. If, however, the transmission is of a type utilizing positive, as jaw, clutches (normally with synchronizers) as ratio establishing clutches, and only a single non-positive clutch as the main clutch between the transmission and the prime mover, then said operating lines 56–59 will extend to conventional and presently known pressure responsive means for appropriately operating and sequencing both the main clutch and the ratio establishing clutches in any presently known and conventional manner.

While one specific item of the apparatus has been chosen and schematically illustrated for disclosure purposes, it will be recognized that at least the broader aspects of the invention can be embodied in other arrangements of apparatus and the hereinafter appended claims will be understood as applicable thereto excepting as said claims by their own terms require otherwise.

The embodiments of the invention in which are exclusive property or privilege is claimed are defined as follows:

1. A control system for a transmission driven through fluid pressure-actuated clutch means by a prime mover and drivingly connected to a load, comprising in combination:

a source of pressure fluid;

passage means connecting said source to said clutch means for permitting the flow of pressure fluid therebetween;

valve means associated with said passage means and shiftable between open and closed positions for controlling the flow of pressure fluid from said source to said clutch means;

throttle control means including a manually moveable throttle control member for controlling the speed of said prime mover, the output torque of said prime mover being in a predetermined relationship to the position of said throttle control member;

control means responsive to the position of said throttle control member for controlling the pressure fluid as supplied to said clutch means to maintain the torque transmitting capacity of said clutch means at a magnitude having a predetermined relationship to the output torque of said prime mover;

actuating means operative when activated to move said valve means from said closed position to said open position, said actuating means including manually controllable shift selector means moveable between an inactive position and an active position, first means connected in series with said selector means and responsive to manual displacement of said throttle control member for activating said actuating means when said shift selector is in said active position, and second means connected in parallel with said first means and responsive to the output speed of said transmission exceeding a predetermined minimum for activating said actuating means when said shift selector is in said active position.

2. A system according to claim 1, including low speed governor means responsive to the speed of said prime mover and arranged to supply additional fuel to said prime mover when the speed of said prime mover falls below a preselected minimum magnitude.

* * * * *

UNITED STATES PATENT AND TRADEMARK OFFICE
CERTIFICATE OF CORRECTION

PATENT NO. : 3,904,007
DATED : September 9, 1975
INVENTOR(S) : Eugene R. Braun; Elmer A. Richards It is certified that error appears in the above-identified patent and that said Letters Patent are hereby corrected as shown below:

Col. 7, line 13: After "quired" insert---and thus prevent stalling---.

Signed and Sealed this ninth Day of December 1975

[SEAL]

Attest:

RUTH C. MASON
Attesting Officer

C. MARSHALL DANN
Commissioner of Patents and Trademarks